United States Patent
Zhang et al.

(10) Patent No.: US 11,988,420 B2
(45) Date of Patent: May 21, 2024

(54) REFRIGERANT COMPRESSOR HAVING DEDICATED INLETS FOR STATOR AND ROTOR COOLING LINES

(71) Applicant: DANFOSS A/S, Nordborg (DK)

(72) Inventors: Tianli Zhang, Ann Arbor, MI (US); Jin Yan, Tallahassee, FL (US)

(73) Assignee: DANFOSS A/S, Nordborg (DK)

( * ) Notice: Subject to any disclaimer, the term of this patent is extended or adjusted under 35 U.S.C. 154(b) by 318 days.

(21) Appl. No.: 17/574,813

(22) Filed: Jan. 13, 2022

(65) Prior Publication Data

US 2022/0243965 A1 Aug. 4, 2022

Related U.S. Application Data

(60) Provisional application No. 63/145,009, filed on Feb. 3, 2021.

(51) Int. Cl.
| | |
|---|---|
| F25B 31/02 | (2006.01) |
| F04D 25/06 | (2006.01) |
| H02K 1/30 | (2006.01) |
| H02K 5/20 | (2006.01) |
| H02K 9/06 | (2006.01) |

(52) U.S. Cl.
CPC ............ F25B 31/026 (2013.01); F04D 25/06 (2013.01); H02K 1/30 (2013.01); H02K 5/207 (2021.01); H02K 9/06 (2013.01)

(58) Field of Classification Search
CPC ........ F25B 31/026; H02K 5/207; H02K 1/30; H02K 9/06; F04D 25/06
See application file for complete search history.

(56) References Cited

U.S. PATENT DOCUMENTS

| | | | | |
|---|---|---|---|---|
| 6,065,297 | A * | 5/2000 | Tischer | F04D 25/06 |
| | | | | 62/505 |
| 9,822,998 | B2 * | 11/2017 | Knopp | F04D 25/0606 |
| 10,794,619 | B2 * | 10/2020 | Knopp | F04D 25/0606 |
| 11,578,901 | B2 * | 2/2023 | Heger | H02K 9/10 |
| 2009/0044548 | A1 * | 2/2009 | Masoudipour | F25B 1/04 |
| | | | | 62/505 |
| 2014/0363311 | A1 * | 12/2014 | Schreiber | F04D 29/053 |
| | | | | 417/420 |
| 2016/0003510 | A1 * | 1/2016 | De Larminat | F25B 43/02 |
| | | | | 62/470 |
| 2016/0138841 | A1 * | 5/2016 | Thornton | F25B 1/053 |
| | | | | 62/505 |
| 2017/0268806 | A1 * | 9/2017 | Knopp | F04D 25/0606 |
| 2018/0073521 | A1 * | 3/2018 | Kobayashi | F04D 17/10 |
| 2018/0252233 | A1 * | 9/2018 | Suemitsu | F04D 29/62 |
| 2019/0006916 | A1 * | 1/2019 | Peterson | F25B 31/006 |
| 2022/0178593 | A1 * | 6/2022 | Thornton | H02K 5/203 |
| 2022/0239183 | A1 * | 7/2022 | Wolgemuth | F25B 31/008 |

* cited by examiner

*Primary Examiner* — Nelson J Nieves
(74) *Attorney, Agent, or Firm* — Carlson, Gaskey & Olds, P.C.

(57) ABSTRACT

In some aspects, the techniques described herein relate to a refrigerant compressor, including: an impeller; a shaft; a motor configured to rotate the impeller via the shaft, wherein the motor includes a stator and a rotor; and a housing surrounding the motor, wherein the housing includes a first inlet configured to permit fluid to enter the housing and flow along a stator cooling line and a second inlet configured to permit fluid to enter the housing and flow a rotor cooling line, and wherein the first inlet is separate from the second inlet.

16 Claims, 3 Drawing Sheets

FIG.3

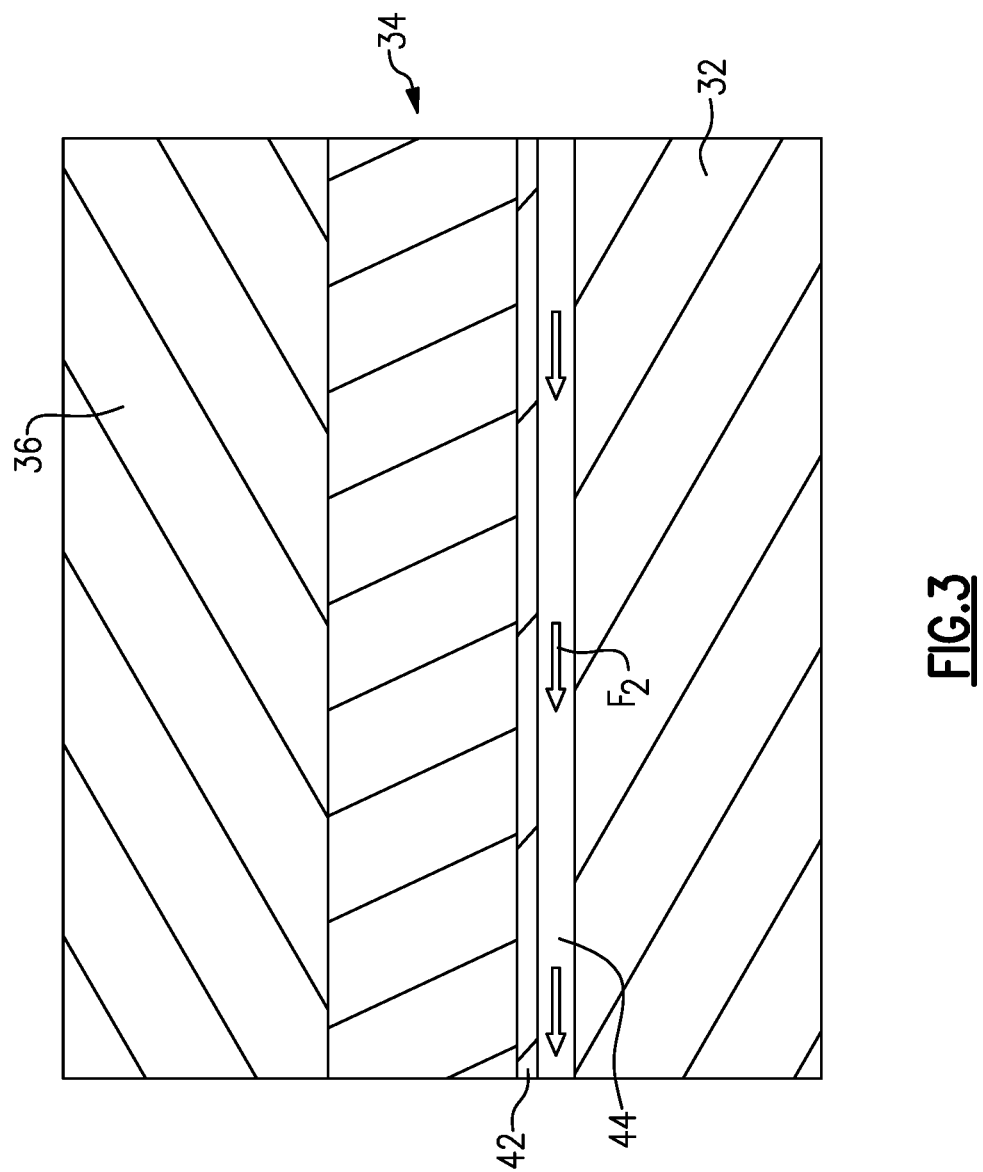

REFRIGERANT COMPRESSOR HAVING DEDICATED INLETS FOR STATOR AND ROTOR COOLING LINES

RELATED APPLICATIONS

This application claims the benefit of U.S. Provisional Application No. 63/145,009, filed Feb. 3, 2021, the entirety of which is herein incorporated by reference.

BACKGROUND

Refrigerant compressors are used to circulate refrigerant in a chiller via a refrigerant loop. Refrigerant loops are known to include a condenser, an expansion device, and an evaporator. The compressor compresses the refrigerant, which then travels to a condenser, which in turn cools and condenses the refrigerant. The refrigerant then goes to an expansion device, which decreases the pressure of the fluid, and to the evaporator, where the refrigerant is vaporized, completing a refrigeration cycle.

Many refrigerant compressors are centrifugal compressors and have an electric motor that drives at least one impeller to pressurize refrigerant. The at least one impeller is mounted to a rotatable shaft. The motor in some examples is an electric motor including a rotor and a stator.

SUMMARY

In some aspects, the techniques described herein relate to a refrigerant compressor, including: an impeller; a shaft; a motor configured to rotate the impeller via the shaft, wherein the motor includes a stator and a rotor; and a housing surrounding the motor, wherein the housing includes a first inlet configured to permit fluid to enter the housing and flow along a stator cooling line and a second inlet configured to permit fluid to enter the housing and flow a rotor cooling line, and wherein the first inlet is separate from the second inlet.

In some aspects, the techniques described herein relate to a refrigerant compressor, wherein the rotor is directly mounted to the shaft and is configured to rotate with the shaft.

In some aspects, the techniques described herein relate to a refrigerant compressor, wherein the rotor is provided by magnetic material.

In some aspects, the techniques described herein relate to a refrigerant compressor, wherein the shaft includes a non-magnetic portion.

In some aspects, the techniques described herein relate to a refrigerant compressor, further including: a sleeve connecting the rotor to the shaft, wherein the sleeve radially surrounds the rotor.

In some aspects, the techniques described herein relate to a refrigerant compressor, wherein the shaft includes a radial recess, and the sleeve is arranged in the recess such that the sleeve is radially flush with the shaft.

In some aspects, the techniques described herein relate to a refrigerant compressor, wherein the sleeve is arranged such that a radial gap exists radially between the sleeve and an inner surface of the stator.

In some aspects, the techniques described herein relate to a refrigerant compressor, wherein the radial gap extends along the entire axial length of the rotor.

In some aspects, the techniques described herein relate to a refrigerant compressor, wherein the housing includes a main portion extending generally from a first location adjacent the impeller to a second location on an opposite side of the motor as the impeller, an end cap adjacent the second location and enclosing a first end of the main portion, and a wall adjacent the first location and providing a boundary between the motor and the impeller.

In some aspects, the techniques described herein relate to a refrigerant compressor, wherein the main portion includes both the first inlet and the second inlet.

In some aspects, the techniques described herein relate to a refrigerant compressor, wherein the end cap includes an outlet, and wherein the refrigerant compressor is configured such that fluid flowing along both the stator and rotor cooling lines exits the refrigerant compressor via the outlet.

In some aspects, the techniques described herein relate to a refrigerant compressor, wherein the refrigerant compressor is configured such that fluid flowing along the stator cooling line intermixes with fluid flowing along the rotor cooling line at a location upstream of the end cap and downstream of the motor.

In some aspects, the techniques described herein relate to a refrigerant compressor, wherein the refrigerant compressor is configured such that: the fluid flowing along the rotor cooling line is not provided by leakage flow between the shaft and the wall, the fluid flowing along the rotor cooling line is not provided by flow that has exited the stator cooling line, and the fluid flowing along the stator cooling line is not provided by fluid that has exited the rotor cooling line.

In some aspects, the techniques described herein relate to a refrigerant system, including: a main refrigerant loop including a compressor, a condenser, an evaporator, and an expansion device, wherein the compressor includes: an impeller; a shaft; a motor configured to rotate the impeller via the shaft, wherein the motor includes a stator and a rotor; and a housing surrounding the motor, wherein the housing includes a first inlet configured to permit fluid to enter the housing and flow along a stator cooling line and a second inlet configured to permit fluid to enter the housing and flow a rotor cooling line, and wherein the first inlet is separate from the second inlet.

In some aspects, the techniques described herein relate to a refrigerant system, wherein: the rotor is directly mounted to the shaft and is configured to rotate with the shaft, the rotor is provided by magnetic material, the compressor further includes a sleeve connecting the rotor to the shaft, and the sleeve radially surrounds the rotor.

In some aspects, the techniques described herein relate to a refrigerant system, wherein the shaft includes a radial recess, and the sleeve is arranged in the recess such that the sleeve is radially flush with the shaft.

In some aspects, the techniques described herein relate to a refrigerant system, wherein the sleeve is arranged such that a radial gap exists radially between the sleeve and an inner surface of the stator.

In some aspects, the techniques described herein relate to a refrigerant system, wherein the radial gap extends along the entire axial length of the rotor.

In some aspects, the techniques described herein relate to a refrigerant system, wherein: the housing includes a main portion extending generally from a first location adjacent the impeller to a second location on an opposite side of the motor as the impeller, an end cap adjacent the second location and enclosing a first end of the main portion, and a wall adjacent the first location and providing a boundary between the motor and the impeller, the main portion includes both the first inlet and the second inlet, the end cap includes an outlet, and the refrigerant compressor is configured such that fluid flowing along both the stator and rotor cooling lines exits the refrigerant compressor via the outlet.

In some aspects, the techniques described herein relate to a refrigerant system, wherein the compressor is configured such that: the fluid flowing along the rotor cooling line is not provided by leakage flow between the shaft and the wall, the fluid flowing along the rotor cooling line is not provided by flow that has exited the stator cooling line, and the fluid flowing along the stator cooling line is not provided by fluid that has exited the rotor cooling line.

BRIEF DESCRIPTION OF THE DRAWINGS

FIG. 3 is a close-up view of a stator, a rotor, and a rotor sleeve.

DETAILED DESCRIPTION

Figure 1:
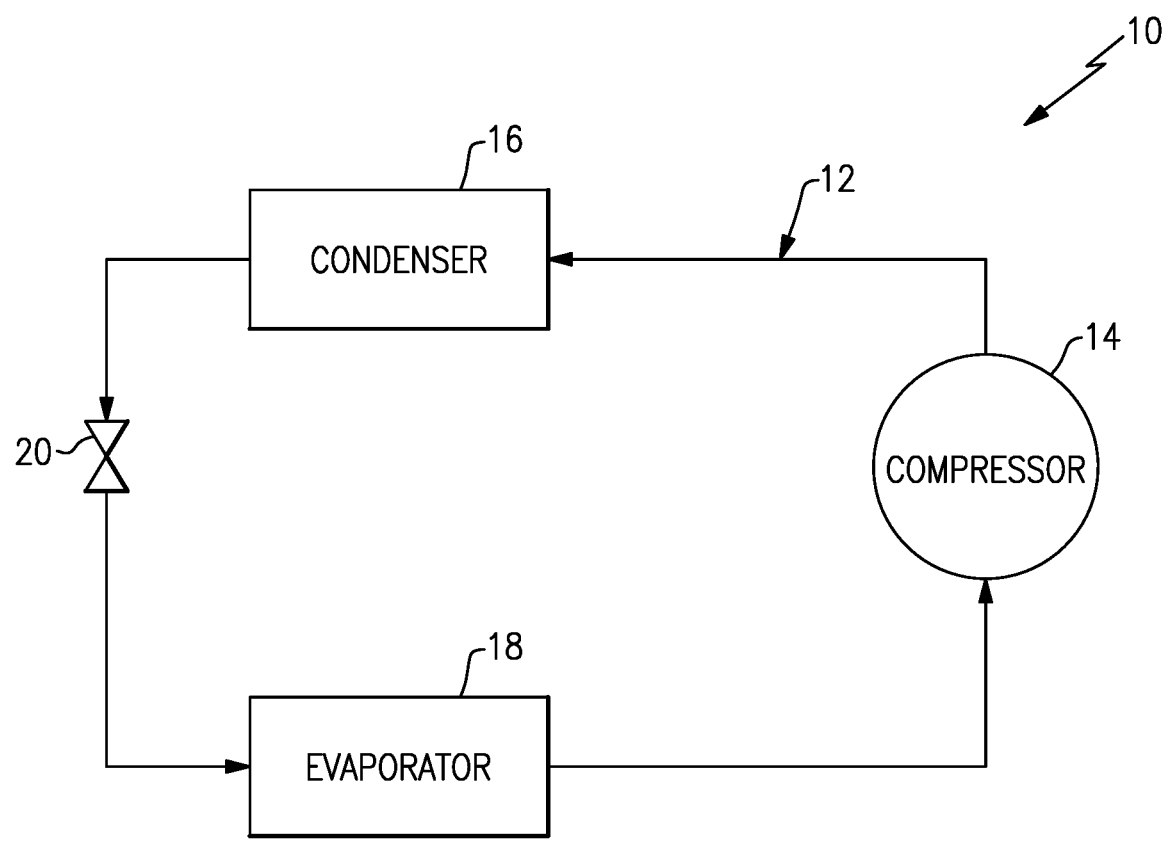
FIG. 1 schematically illustrates an example refrigerant system.

FIG. 1 illustrates a refrigerant system 10. The refrigerant system 10 includes a main refrigerant loop, or circuit, 12 in communication with a compressor 14, a condenser 16, an evaporator 18, and an expansion device 20. This refrigerant system 10 may be used in a chiller, for example. In that example, a cooling tower may be in fluid communication with the condenser 16. While a particular example of the refrigerant system 10 is shown, this application extends to other refrigerant system configurations, including configurations that do not include a chiller. For instance, the main refrigerant loop 12 can include an economizer downstream of the condenser 16 and upstream of the expansion device 20.

Figure 2:
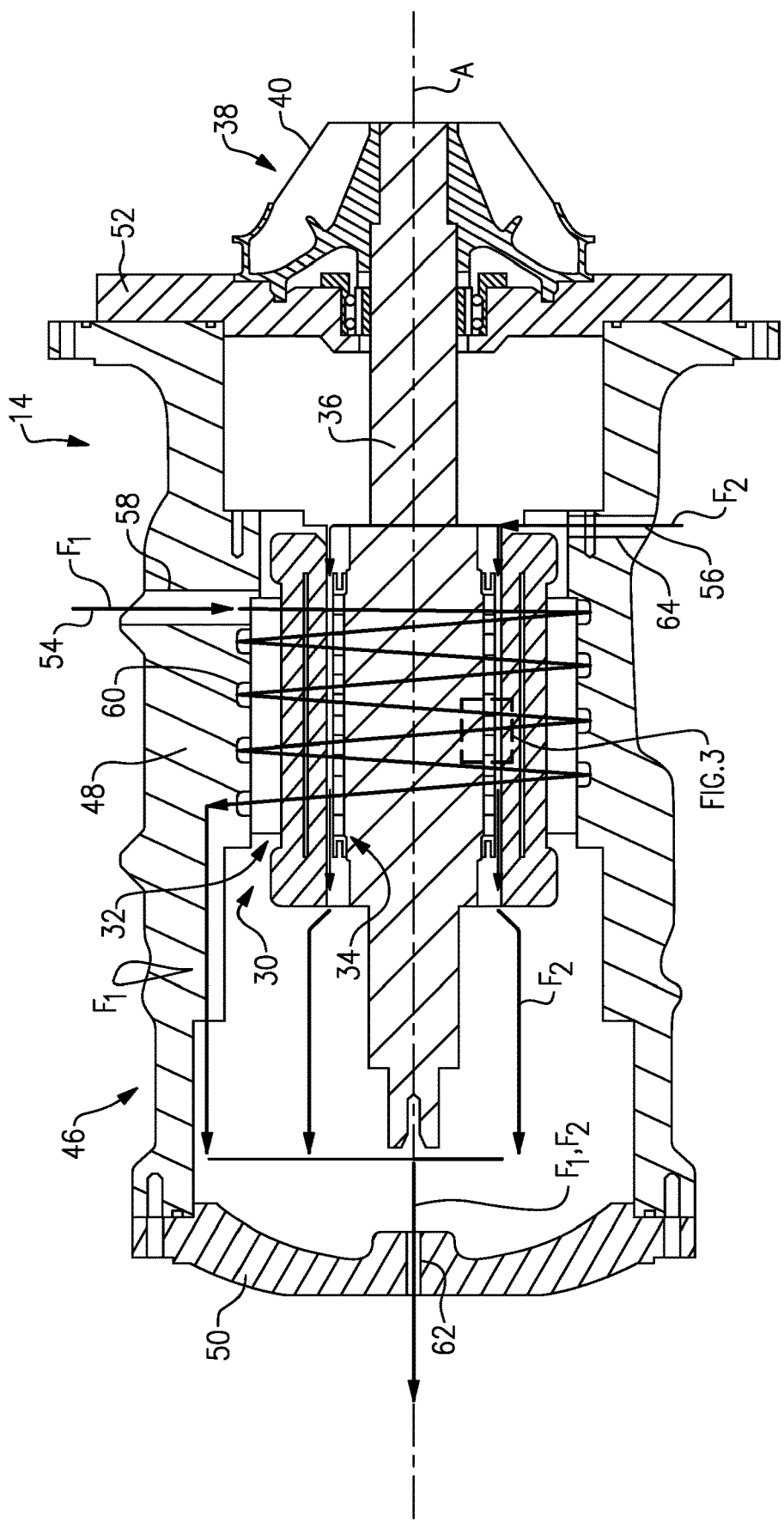
FIG. 2 illustrates additional detail of a compressor.

FIG. 2 illustrates an example refrigerant compressor 14 according to this disclosure. The compressor 14 includes an electric motor 30 including a stator 32 arranged radially outside a rotor 34.

The rotor 34 is connected to a shaft 36, which rotates to drive a compression stage 38. The compression stage 38 includes an impeller 40 mounted on the shaft 36 and rotatable about an axis A to compress refrigerant. The shaft 36 may be rotatably supported by a number of bearing assemblies, such as magnetic bearings.

The rotor 34 may be directly mounted to the shaft 36, as shown in FIG. 3. The rotor 34, in this example, is made of magnetic material and is rotatable in response a magnetic field of the stator 32. In particular, the rotor 34 is made of a permanent magnet. The rotor 34 is configured to rotate with the shaft 36 and the compression stage 38.

In one example of this disclosure, the rotor 34 is provided by magnetic material which is attached to the remainder of the shaft 36, which may be non-magnetic. In this example, a sleeve 42 is configured to connect and attach the rotor 34 to the remainder of the shaft 36.

In FIG. 3, the sleeve 42 is radially outward of and radially surrounds the rotor 34 about the entire circumference of the rotor 34. The sleeve 42 may be considered part of the rotor 34 and/or a part of the shaft 36, and may be referred to as a rotor sleeve. In this regard, the rotor 34 and sleeve 42 may together be considered a rotor or rotor assembly. In one example, the shaft 36 includes a radial recess, and the sleeve 42 rests in the recess and is radially flush with the remainder of the shaft 36. In another example, the sleeve 42 may project radially outward of the remainder of the shaft 36. In either case, a radial gap 44 exists radially between the sleeve 42 and an inner surface of the stator 32. The radial gap 44 extends along the entire axial length of the rotor 34.

With reference back to FIG. 2, the compressor 14 in this example includes a housing 46, a portion of which surrounds and encloses the motor 30. In particular, the housing 46 in FIG. 2 includes a plurality of pieces. A main portion 48 of the housing 46 extends from a point adjacent the compression stage 38 to an opposite side of the motor 30. An end cap 50 encloses the main portion 48 at one end. A wall 52 attached to an opposite end of the main portion 48 as the end cap 50 provides a boundary between the motor 30 and the compression stage 38. The shaft 36 projects through the wall 52 to connect to the impeller 40.

The motor 30 is cooled by refrigerant. In this example, the motor 30 is cooled by the same refrigerant that is pressurized in the compression stage 38. An example refrigerant is R-1233ZD, which is a relatively low-density refrigerant.

In this example, the motor 30 is cooled by stator cooling lines 54 and rotor cooling lines 56. The stator and rotor cooling lines 54, 56 are passageways within the motor 30 and are represented by the relatively thick lines in FIG. 2. The stator and rotor cooling lines 54, 56 are mostly independent of one another, except at locations downstream of the motor 30, as discussed below. Fluid $F_1$, which is refrigerant such as R-1233ZD, is representative of fluid flowing along the stator cooling line 54, and fluid $F_2$ is representative of fluid flowing along the rotor cooling line 56. The fluid $F_1$, $F_2$ is sourced from the main refrigerant loop 12, such as from adjacent an economizer, in an example.

The main portion 48 includes separate, dedicated inlets for the stator and rotor cooling lines 54, 56, in this example. In particular, with reference to the stator cooling line 54, the fluid $F_1$ enters the main portion 48 via an inlet 58. Downstream of the inlet 58, the fluid $F_1$ proceeds to circulate about the stator 32 by way of a circumferential passageway 60. In one example, an outer radial boundary of the circumferential passageway 60 is provided in part by a helical channel formed in an inner wall of the main portion 48. In this example, an outer surface of the stator 32 provides an inner radial boundary for the circumferential passageway 60. Downstream of the stator 32, the fluid $F_1$ flows toward the end cap 50 and exits the housing 46 via an outlet 62 formed in the end cap 50.

With reference to the rotor cooling line 56, the fluid $F_2$ enters the main portion 48 via an inlet 64. The inlet 64 is separate from the inlet 58. Further, the inlet 64 is axially between the motor 30 and the compression stage 38, in this example. As such, fluid $F_2$ flowing into the inlet 64 can enter into and flow along the radial gap 44. Downstream of the radial gap 44, the fluid $F_2$ flows toward the end cap 50 and exits the housing 46 via the outlet 62.

Fluids $F_1$, $F_2$ may intermix upstream of the end cap 50 and downstream of the motor 30. Thus, the fluids $F_1$, $F_2$ exit the housing 46 via a common outlet 62. Downstream of the outlet 62, the fluids $F_1$, $F_2$ are returned to the main refrigerant loop 12.

The fluid $F_2$ is not provided by leakage flow between the shaft 36 and the wall 52. Nor is the fluid $F_2$ provided by flow that has already been circulated relative to the stator 32. Further, the fluid $F_1$ is not provided by fluid that has already been circulated relative to the rotor 34. In this way, the fluids $F_1$, $F_2$ flowing along the stator and rotor cooling lines 54, 56 are able to effectively absorb heat from the stator 32 and rotor 34, respectively.

Further, since the fluids $F_1$, $F_2$ are provided from separate, dedicated inlets and flow along a separate flow paths, that is until the fluids $F_1$, $F_2$ are downstream of the motor 30, the fluids $F_1$, $F_2$ exhibit a decreased pressure drop between their respective inlets and outlets, and thus the fluids $F_1$, $F_2$ can exhibit a greater flow rate compared to prior motor cooling fluids. The greater flow rate also leads to more effective heat transfer.

It should be understood that terms such as "axial," "radial," and "circumferential" are used above with reference to the normal operational attitude of an electric machine. Further, these terms have been used herein for purposes of explanation, and should not be considered otherwise limiting. Terms such "generally," "about," and "substantially" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A refrigerant compressor, comprising:
an impeller;
a shaft;
a motor configured to rotate the impeller via the shaft, wherein the motor includes a stator and a rotor; and
a housing surrounding the motor, wherein the housing includes a first inlet configured to permit fluid to enter the housing and flow along a stator cooling line and a second inlet configured to permit fluid to enter the housing and flow a rotor cooling line, and wherein the first inlet is separate from the second inlet,
wherein the housing includes a main portion extending generally from a first location adjacent the impeller to a second location on an opposite side of the motor as the impeller, an end cap adjacent the second location and enclosing a first end of the main portion, and a wall adjacent the first location and providing a boundary between the motor and the impeller,
wherein the main portion includes both the first inlet and the second inlet, and
wherein the end cap includes an outlet, and wherein the refrigerant compressor is configured such that fluid flowing along both the stator and rotor cooling lines exits the refrigerant compressor via the outlet.

2. The refrigerant compressor as recited in claim 1, wherein the rotor is directly mounted to the shaft and is configured to rotate with the shaft.

3. The refrigerant compressor as recited in claim 2, wherein the rotor is made of magnetic material.

4. The refrigerant compressor as recited in claim 3, wherein the shaft includes a non-magnetic portion.

5. The refrigerant compressor as recited in claim 3, further comprising:
a sleeve connecting the rotor to the shaft, wherein the sleeve radially surrounds the rotor.

6. The refrigerant compressor as recited in claim 5, wherein the shaft includes a radial recess, and the sleeve is arranged in the recess such that the sleeve is radially flush with the shaft.

7. The refrigerant compressor as recited in claim 5, wherein the sleeve is arranged such that a radial gap exists radially between the sleeve and an inner surface of the stator.

8. The refrigerant compressor as recited in claim 7, wherein the radial gap extends along the entire axial length of the rotor.

9. The refrigerant compressor as recited in claim 1, wherein the refrigerant compressor is configured such that fluid flowing along the stator cooling line intermixes with fluid flowing along the rotor cooling line at a location upstream of the end cap and downstream of the motor.

10. The refrigerant compressor as recited in claim 1, wherein the refrigerant compressor is configured such that:
the fluid flowing along the rotor cooling line is not provided by leakage flow between the shaft and the wall,
the fluid flowing along the rotor cooling line is not provided by flow that has exited the stator cooling line, and
the fluid flowing along the stator cooling line is not provided by fluid that has exited the rotor cooling line.

11. A refrigerant system, comprising:
a main refrigerant loop including a compressor, a condenser, an evaporator, and an expansion device, wherein the compressor includes:
an impeller;
a shaft;
a motor configured to rotate the impeller via the shaft, wherein the motor includes a stator and a rotor; and
a housing surrounding the motor, wherein the housing includes a first inlet configured to permit fluid to enter the housing and flow along a stator cooling line and a second inlet configured to permit fluid to enter the housing and flow a rotor cooling line, and wherein the first inlet is separate from the second inlet,
wherein the housing includes a main portion extending generally from a first location adjacent the impeller to a second location on an opposite side of the motor as the impeller, an end cap adjacent the second location and enclosing a first end of the main portion, and a wall adjacent the first location and providing a boundary between the motor and the impeller,
wherein the main portion includes both the first inlet and the second inlet,
wherein the end cap includes an outlet, and
wherein the refrigerant compressor is configured such that fluid flowing along both the stator and rotor cooling lines exits the refrigerant compressor via the outlet.

12. The refrigerant system as recited in claim 11, wherein:
the rotor is directly mounted to the shaft and is configured to rotate with the shaft,
the rotor is made of magnetic material,
the compressor further comprises a sleeve connecting the rotor to the shaft, and
the sleeve radially surrounds the rotor.

13. The refrigerant system as recited in claim 12, wherein the shaft includes a radial recess, and the sleeve is arranged in the recess such that the sleeve is radially flush with the shaft.

14. The refrigerant system as recited in claim 13, wherein the sleeve is arranged such that a radial gap exists radially between the sleeve and an inner surface of the stator.

15. The refrigerant system as recited in claim 14, wherein the radial gap extends along the entire axial length of the rotor.

16. The refrigerant system as recited in claim 11, wherein the compressor is configured such that:
  the fluid flowing along the rotor cooling line is not provided by leakage flow between the shaft and the wall,
  the fluid flowing along the rotor cooling line is not provided by flow that has exited the stator cooling line, and
  the fluid flowing along the stator cooling line is not provided by fluid that has exited the rotor cooling line.

* * * * *